(12) United States Patent
Peluso et al.

(10) Patent No.: US 10,216,208 B2
(45) Date of Patent: Feb. 26, 2019

(54) LOAD CURRENT SENSING IN VOLTAGE REGULATOR

(71) Applicant: QUALCOMM Incorporated, San Diego, CA (US)

(72) Inventors: Vincenzo Peluso, San Diego, CA (US); Hua Guan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 322 days.

(21) Appl. No.: 14/837,308

(22) Filed: Aug. 27, 2015

(65) Prior Publication Data

US 2017/0060155 A1 Mar. 2, 2017

(51) Int. Cl.
*G05F 1/575* (2006.01)
*H02M 1/00* (2006.01)

(52) U.S. Cl.
CPC ..... *G05F 1/575* (2013.01); *H02M 2001/0009* (2013.01)

(58) Field of Classification Search
CPC . G05F 1/56; G05F 1/575; G05F 1/465; G05F 1/468; G05F 1/462; G05F 1/565; G05F 1/562; G05F 1/567; G05F 1/569; G05F 1/571; G05F 1/573; G05F 1/5735; H02M 2001/0045; H02M 3/1588; H02M 3/156
USPC .................. 323/273–281
See application file for complete search history.

(56) References Cited

U.S. PATENT DOCUMENTS 6,201,375 B1 * 3/2001 Larson .................... G05F 1/573
323/277
7,518,440 B1 * 4/2009 Trifonov ................... H03F 1/08
327/124
2002/0158615 A1 * 10/2002 Goodfellow ..... G01R 19/16519
323/315
2008/0100276 A1 * 5/2008 Negoro ................... G05F 1/565
323/285
2012/0038332 A1 2/2012 Lin
(Continued)

FOREIGN PATENT DOCUMENTS

EP 2318660 A2 10/2011
WO 2011006979 A1 1/2011

OTHER PUBLICATIONS

International Search Report—PCT/US2016/046906—ISA/EPO—dated Nov. 29, 2016.
(Continued)

*Primary Examiner* — Harry R Behm
*Assistant Examiner* — Lorena D Bruner
(74) *Attorney, Agent, or Firm* — Haynes and Boone, LLP (57) ABSTRACT

A voltage regulator having current sense capability may include an input node and an output node. A first output device may be electrically connected between the input node and the output node, and configured to control current flow through the first output device to regulate a voltage at the output node. A current sense circuit may be configured to produce a signal that is indicative of the current through the first output device. The current sense circuit may be configured to perform a first kind of offset compensation operation to reduce an offset voltage in an error amplifier of the current sense circuit, and to perform a second kind of offset compensation operation to reduce the offset voltage in the error amplifier.

11 Claims, 12 Drawing Sheets

(56) References Cited

U.S. PATENT DOCUMENTS

| | | | |
|---|---|---|---|
| 2012/0126760 A1* | 5/2012 | Vemula | G05F 1/575 |
| | | | 323/271 |
| 2014/0103889 A1 | 4/2014 | McCune, Jr. | |
| 2014/0217996 A1 | 8/2014 | Peker et al. | |
| 2014/0224962 A1 | 8/2014 | Pahr | |
| 2015/0008871 A1* | 1/2015 | Petenyi | G05F 1/625 |
| | | | 320/107 |
| 2015/0108842 A1 | 4/2015 | Chen et al. | |
| 2015/0115918 A1 | 4/2015 | Oikarinen | |
| 2015/0155780 A1 | 6/2015 | Searles et al. | |
| 2016/0085284 A1* | 3/2016 | Sumitomo | G05F 1/10 |
| | | | 713/340 |
| 2016/0173041 A1* | 6/2016 | Prasad | H03F 3/393 |
| | | | 330/9 |

OTHER PUBLICATIONS

Written Opinion—PCT/US2016/046906—ISA/EPO—dated Nov. 29, 2016.

Shi X., et al., "Gain- and offset-compensated non-inverting SC Circuits", Circuits and Systems, 2000. Proceedings. ISCAS 2000 Geneva. The 2000 I EEE International Symposium on May 28-31, 2000, Piscataway, NJ, USA,IEEE, vol. 2, May 28, 2000 (May 28, 2000), pp. 425-428, XP010502751, ISBN: 978-0-7803-5482-1.

* cited by examiner

LOAD CURRENT SENSING IN VOLTAGE REGULATOR

BACKGROUND

Unless otherwise indicated, the foregoing is not admitted to be prior art to the claims recited herein and should not be construed as such.

Manufacturers of electronic devices, especially portable battery powered devices, usually require information about how much power is being consumed by various electronic components in electronic devices. Knowing the amount of current being delivered to a load can be useful in a wide variety of applications. For example, in low-power electronic devices (e.g., smart phone, computer tablets, and other consumer electronics) the supply current can be monitored to understand the system's impact on battery life for purpose of power optimization of the device and end user applications.

Low dropout (LDO) voltage regulators are common in portable electronic devices. Generally, a current sensor is a circuit that can detect a current (e.g., current through a load) and produce an output signal (e.g., current) that is representative of the detected current.

SUMMARY

In accordance with some aspects of the present disclosure, a circuit may include an input node and an output node. A first output device may be electrically connected between the input node and the output node. The circuit may include a regulator configured to control current flow through the first output device to regulate a voltage at the output. The circuit may include a current sense circuit configured to produce a signal indicative of the flow of current through the first output device. The current sense circuit may include an error amplifier and a second output device. The error amplifier may be configured to control the second output device to produce the signal indicative of the flow of current through the first output device. The current sense circuit may be further configured to perform a first kind of offset compensation operation to reduce an offset voltage in the error amplifier and to perform a second kind of offset compensation operation different from the first kind of offset compensation operation to also reduce the offset voltage in the error amplifier.

In accordance with some aspects of the present disclosure, a method may include regulating an output voltage at an output node of the circuit. The method may further include sensing a current flow at the output node and generating a control signal in response to the current flow at the output node. The method may include controlling an output device using the control signal to produce a signal indicative of the current flow at the output node. The method may include reducing an offset in the control signal, including performing a first kind of offset compensation operation and performing a second kind of offset compensation operation different from the first kind.

In accordance with some aspects of the present disclosure, a circuit may include means for regulating an output voltage at an output node of the circuit. The circuit may further include means for sensing a current flow at the output node, means for generating a control signal in response to the current flow at the output node, means for producing a signal indicative of the current flow at the output node using the control signal; and means for reducing an offset in the control signal, including means for performing a first kind of offset compensation operation and means for performing a second kind of offset compensation operation different from the first kind.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
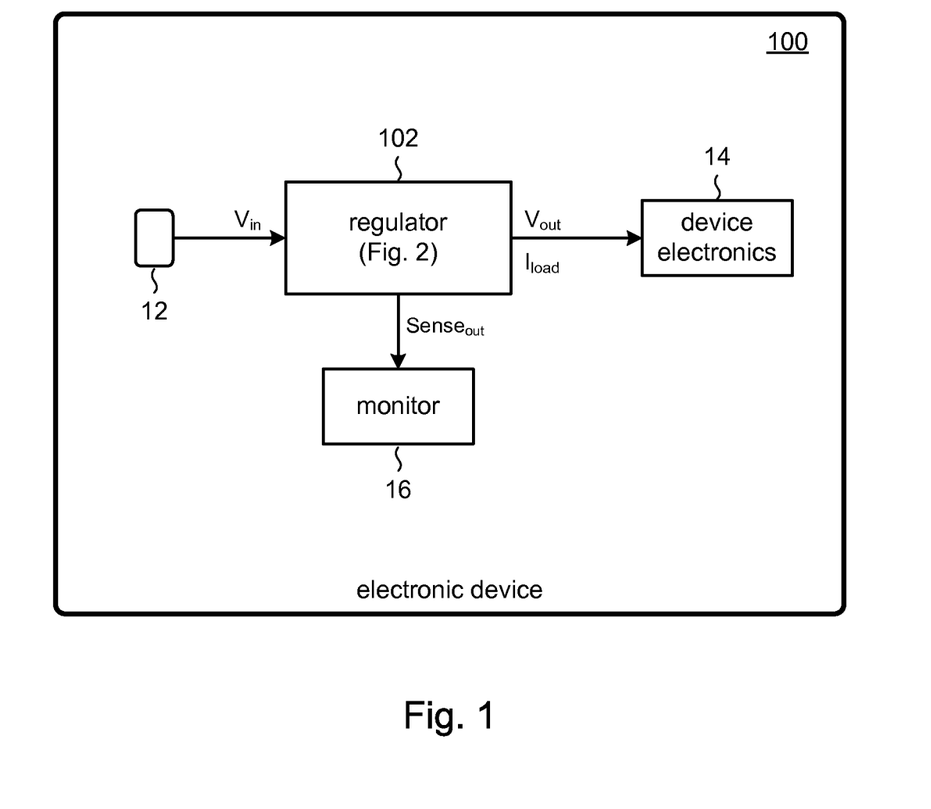
FIG. 1 is a high level block diagram of an electronic device having a voltage regulator in accordance with the present disclosure.

FIG. 1 shows an illustrative representation of an electronic device 100 in accordance with embodiments of the present disclosure. In some embodiments, for example, the electronic device 100 may be a portable computing device such as a laptop computer, a computer tablet, a smartphone, and so on. In other embodiments, the electronic device 100 may be a power supply, a battery charger, and so on.

The electronic device 100 may include a voltage regulator 102 to regulate an input voltage $V_{in}$ to produce a regulated output voltage $V_{out}$. In some embodiments, a power source 12 that supplies the input voltage $V_{in}$ may be internally provided, for example, via a battery. In other embodiments, the power source 12 may be externally provided.

The regulated output voltage $V_{out}$ may provide power to various device electronics 14 that comprise the electronic device 100. A power monitoring circuit 16 may monitor the power consumption of the device electronics 14. In some embodiments, the power monitoring circuit 16 may be an application processor that can monitor and manage power usage of the device electronics 14. In some embodiments, for example, the voltage regulator 102 may provide a signal Sense$_{out}$ that is indicative of the load current $I_{load}$ that is flowing into the device electronics 14. The power monitoring circuit 16 may use this information to monitor or otherwise track power consumption of the various subsections that comprise the device electronics, especially where low power consumption is important. The power monitoring circuit 16 may optimize power consumption in the electronic device 100 (e.g., both system functions and end user applications) and maximize battery life (e.g., time before battery is drained). Additionally, in the realm of mobile electronic devices, a main objective may be long battery life. In some other applications (e.g., electronic devices used in server farms) the objective could be minimization of heat and cooling requirements.

Figure 2:
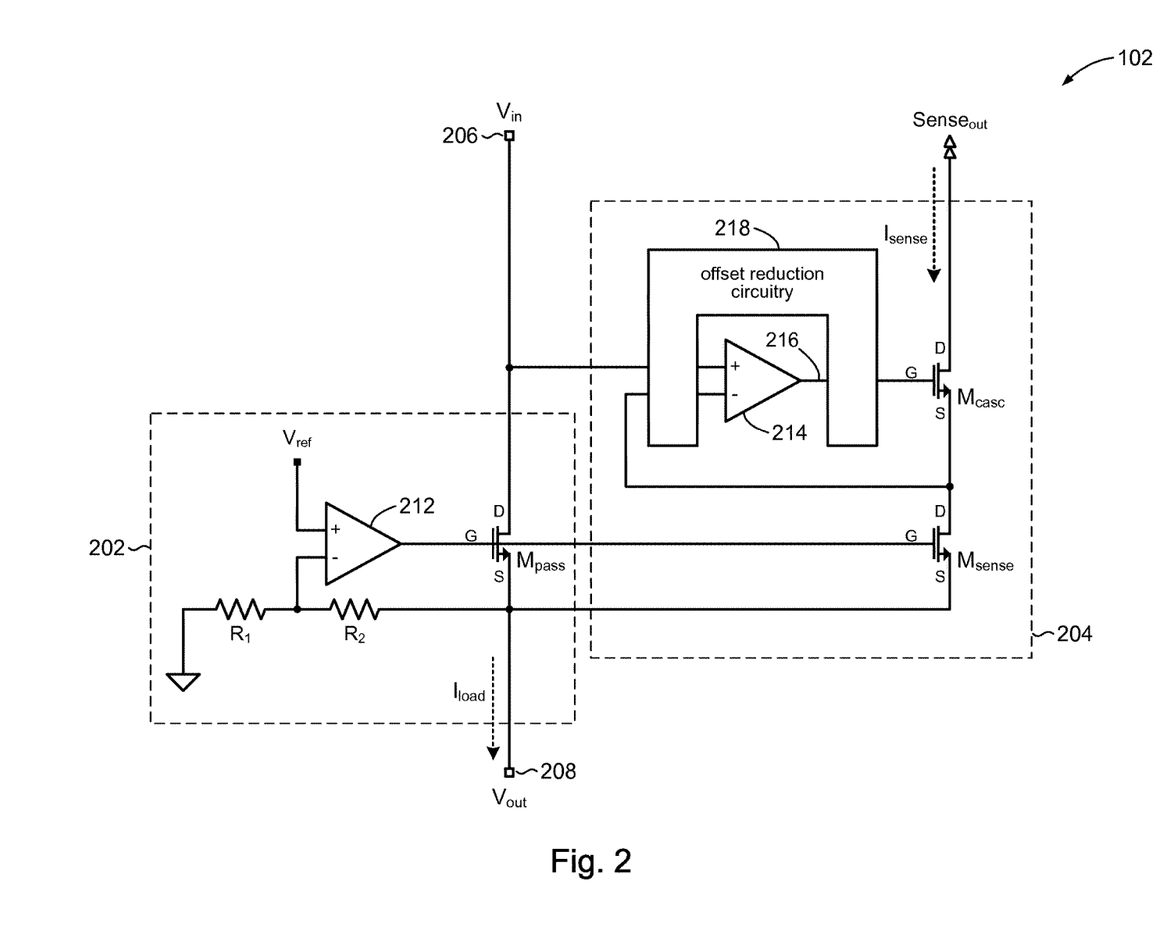
FIG. 2 is a high level block diagram of a voltage regulator in accordance with the present disclosure.

FIG. 2 shows an illustrative embodiment of a voltage regulator 102 in accordance with the present disclosure. The voltage regulator 102 may include means for regulating an output voltage $V_{out}$ at an output node 208. In some embodiments, for example, the means may include a low dropout (LDO) regulator 202. The LDO regulator 202 may include a power output device $M_{pass}$. In some embodiments, for example, power output device $M_{pass}$ may be a suitable power MOSFET device used to drive a load (e.g., device electronics 14, FIG. 1) at output node 208. The power output device $M_{pass}$ may be connected between the input node 206 and the output node 208. For example, the power output device $M_{pass}$ may have a first terminal (e.g., drain) connected to input node 206 and a second terminal (e.g., source) connected to output node 208. In a particular embodiment, $M_{pass}$ is an NMOS device. It will be appreciated, however, that persons of ordinary skill will understand that a PMOS version of the circuit can be easily implemented.

The LDO regulator 202 may include a regulator section connected to the power output device $M_{pass}$. In some embodiments, the regulator section may include an error amplifier 212 and a feedback path. The error amplifier 212 may have an input (e.g., non-inverting input) connected to a reference voltage $V_{ref}$, and another input (e.g., inverting input) connected to the feedback path. The feedback path may comprise a resistor divider network, $R_1$, $R_2$ to feed back a portion of the output voltage $V_{out}$ to the input of error amplifier 212. The portion of the output voltage $V_{out}$ fed back to amplifier 212 may be compared to reference voltage $V_{ref}$ to produce an output (error signal) to control the gate of power output device $M_{pass}$, and hence regulate the output voltage $V_{out}$ to a value depending on the reference voltage $V_{ref}$.

The voltage regulator 102 may further include a current sense circuit 204. The current sense circuit 204 may include means for sensing a current flow $I_{load}$ at the output node 208. In some embodiments, for example, the means for sensing may be a sense device $M_{sense}$ connected to the power output device $M_{pass}$ in a current mirror configuration. The sense device $M_{sense}$ may be an NMOS device, although a PMOS device may be used in other embodiments. The current through sense device $M_{sense}$ can therefore mirror the current through power output device $M_{pass}$. Since sense device $M_{sense}$ serves to indicate current flow, sense device $M_{sense}$ can be made much smaller than power output device $M_{pass}$ in order to save on circuit area of the voltage regulator 102. Accordingly, the size (e.g., width/length ratio, W/L) of sense device $M_{sense}$ may be several hundreds to thousands of times smaller that the size of power output device $M_{pass}$.

The current sense circuit 204 may further include means for producing a signal Sense$_{out}$ that is indicative of the current flow at output node 208. In some embodiments, for example, the means may be a current sense output device $M_{casc}$ connected in series with the sense device $M_{sense}$. The current sense output device $M_{casc}$ may be an NMOS device.

In some embodiments, the signal Sense$_{out}$ may be the current $I_{sense}$ through the current sense output device $M_{casc}$. The current $I_{sense}$ flowing through current sense output device $M_{casc}$ may be controlled by a control signal 216 at the gate of $M_{casc}$. Means for generating the control signal 216 may include an error amplifier 214 connected to the current sense output device $M_{casc}$. The error amplifier 214 may be configured as a high gain feedback loop to compare the $V_{DS}$ across power output device $M_{pass}$ and the $V_{DS}$ across sense device $M_{sense}$ to produce an output as control signal 216. Control signal 216 can control the voltage $V_{DS}$ across sense device $M_{sense}$ by controlling the current $I_{sense}$ through the current sense output device $M_{casc}$ and hence through $M_{sense}$.

The error amplifier 214 may have an internal DC offset, for example, due to imperfect matching of the components that comprise the error amplifier 214. Accordingly, the control signal 216 produced by error amplifier 214 can exhibit an offset which can ultimately lead to errors in the signal Sense$_{out}$. In accordance with the present disclosure, the current sense circuit 204 may further include means for compensating for the offset in control signal 216. In some embodiments, for example, the means may include offset reduction circuitry 218. In accordance with the present disclosure, the offset reduction circuitry 218 may operate at the inputs and the output of error amplifier 214 to reduce the internal DC offset.

Figure 2A:
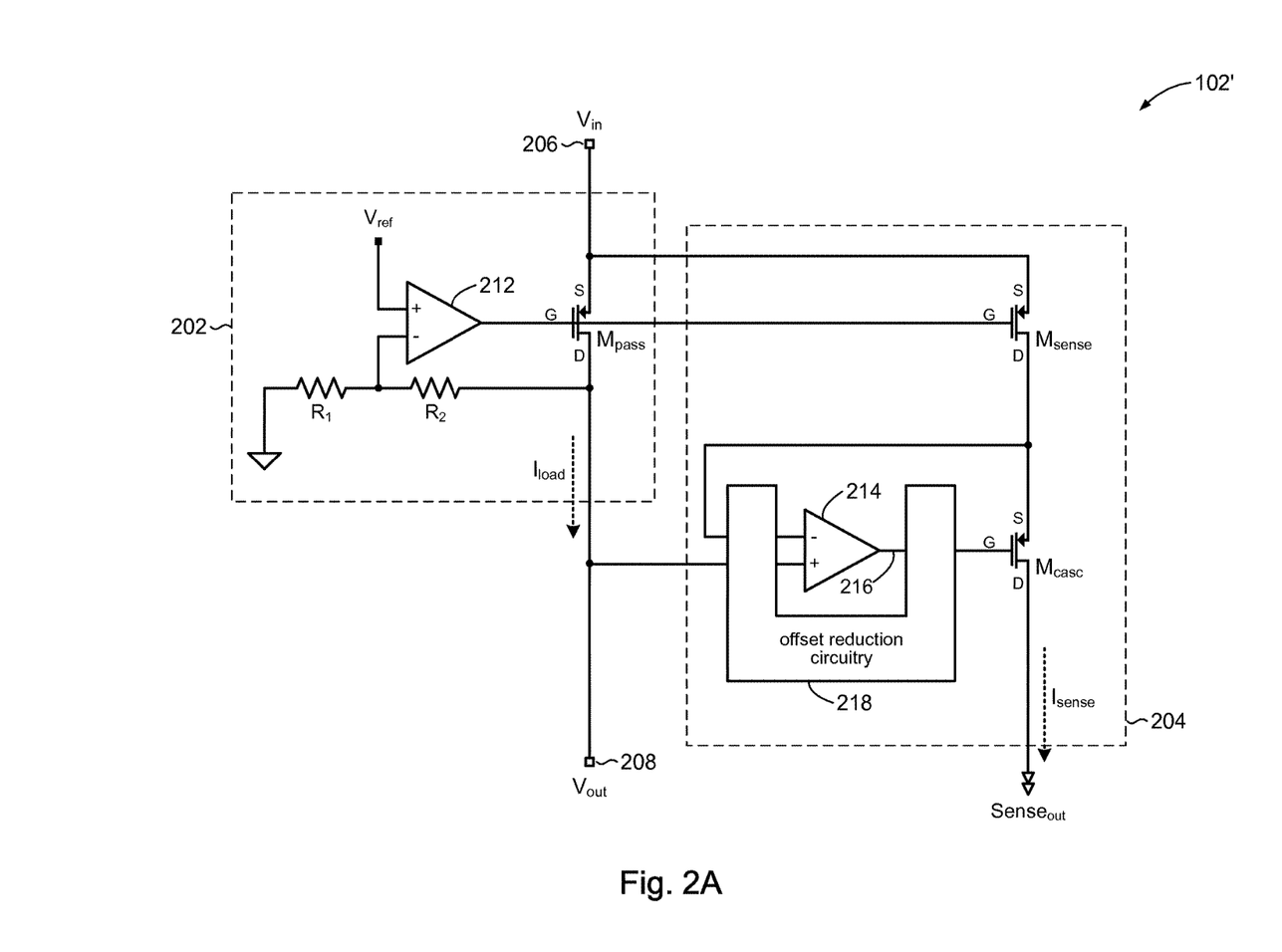
FIG. 2A shows a PMOS version of a voltage regulator in accordance with the present disclosure.

As noted above, the voltage regulator 102 in FIG. 2 uses NMOS devices. One of ordinary skill will appreciate that a PMOS version can be easily realized. FIG. 2A shows a voltage regulator 102' that uses PMOS devices. For discussion purposes, however, the NMOS version shown in FIG. 2 will be used.

Figure 3:
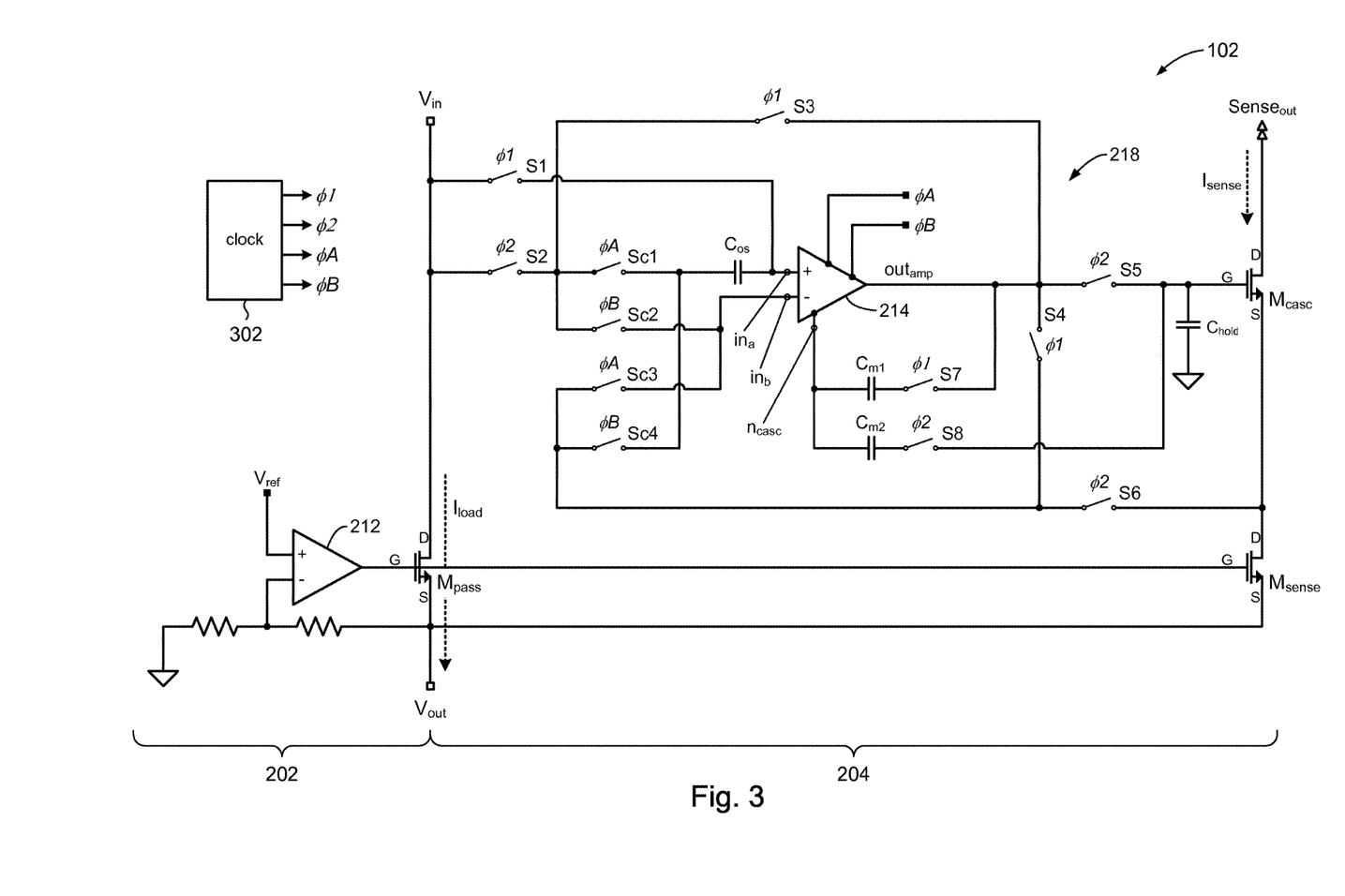
FIG. 3 shows an illustrative embodiment of a voltage regulator in accordance with the present disclosure.

FIG. 3 shows the voltage regulator 102 with additional detail of offset reduction circuitry 218 in accordance with some embodiments of the present disclosure. In some embodiments, the offset reduction circuitry 218 may include means for performing offset compensation operations of a first kind and means for performing offset compensation operations of a second kind. In some embodiments, for example, the means for performing offset compensation operations of a first kind may include sampling switches S1-S8 and capacitors $C_{os}$ and $C_{hold}$. Each of the sampling switches S1-S8 may be operated in an OPEN state or a CLOSED state in accordance with clock signals (phases) φ1 and φ2. The offset reduction circuitry 218 may include a clock generator 302 that is configured to produce φ1, φ2. As will be explained in more detail below, the sampling switches S1-S8 may be operated by φ1, φ2 to perform an offset compensation operation referred to herein variously as offset sampling, sampling mode, and the like.

In accordance with the present disclosure, the means for performing offset compensation operations of a first kind may further include Miller compensation to achieve more stable operation of the error amplifier 214. Accordingly, in some embodiments the means for performing offset compensation operations of a first kind may include Miller compensation capacitors (Miller caps) $C_{m1}$, $C_{m2}$. Each Miller cap $C_{m1}$, $C_{m2}$ may be connected to the error amplifier 214 by φ1, φ2 during offset sampling. The error amplifier 214 may have a node $n_{casc}$ to which the Miller caps $C_{m1}$, $C_{m2}$ may be connected.

Figure 3A:
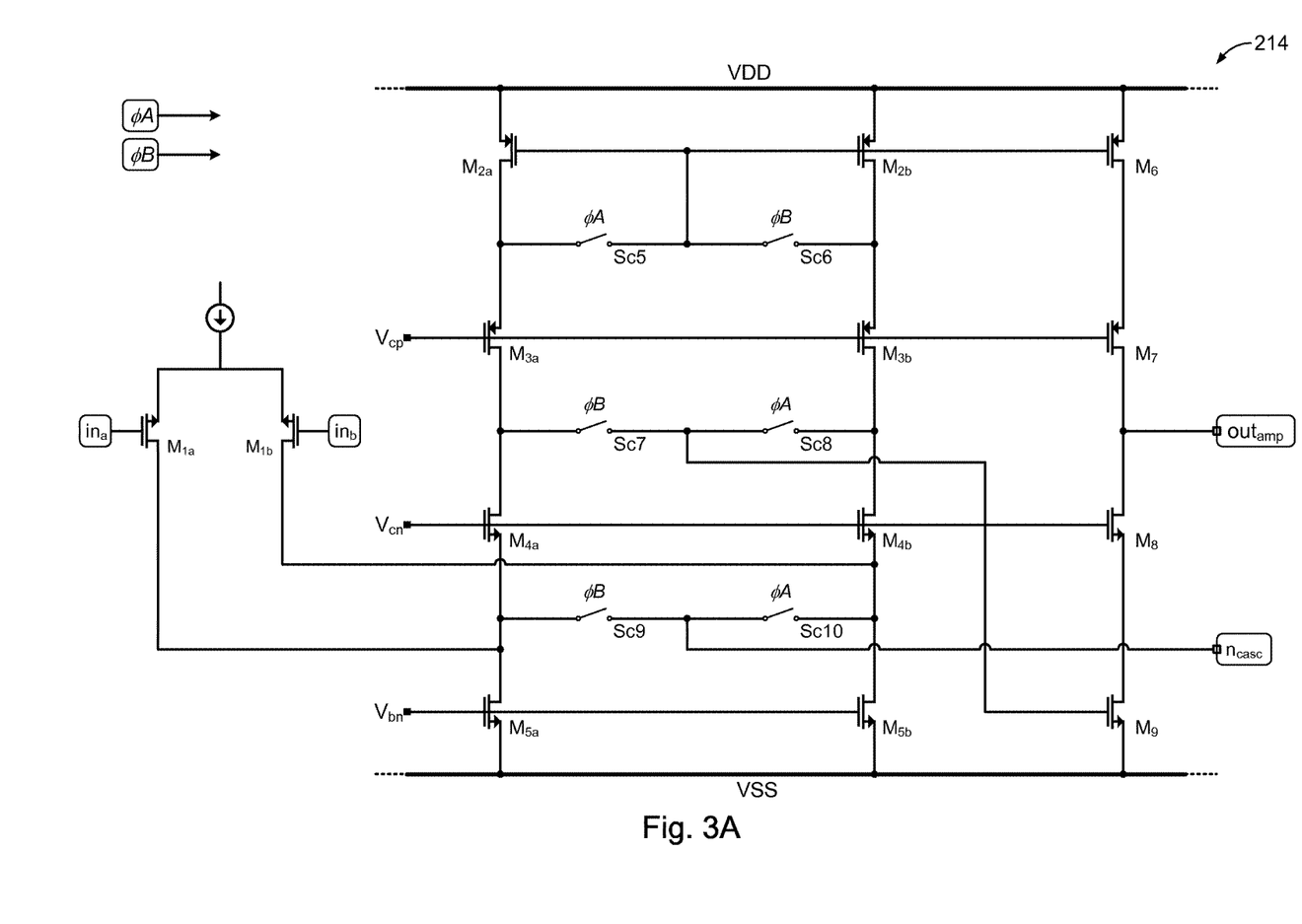
FIG. 3A shows details of an error amplifier in accordance with some embodiments.

Referring to FIGS. 3 and 3A, in some embodiments, the means for performing offset compensation operations of a second kind may include input chopping switches Sc1-Sc4 shown in FIG. 3 and output chopping switches Sc5-Sc10 shown in FIG. 3A. Each of the input and output chopping switches Sc1-Sc10 may be operated in an OPEN state or a CLOSED state in accordance with φA and φB. The clock generator 302 may further be configured to produce φA, φB. As will be explained in more detail below, the input and output chopping switches Sc1-Sc10 may be operated by φA, φB to perform an offset compensation operation referred to herein as "chopping" (chopping operation, etc.).

Figure 4:
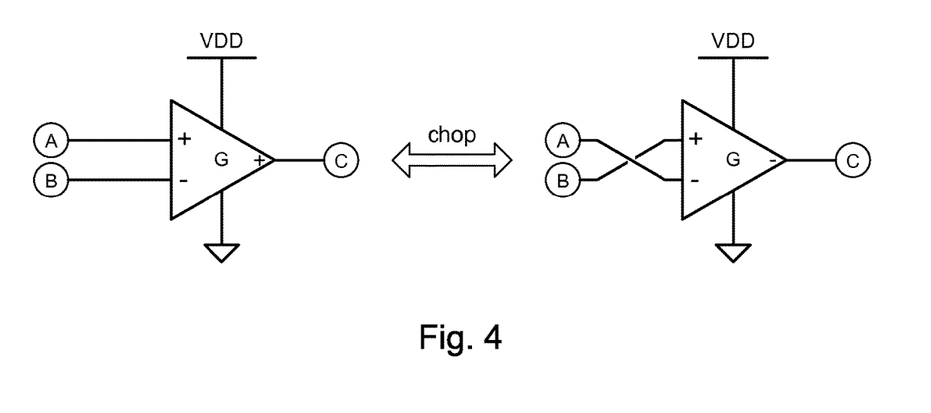
FIG. 4 illustrates an example of chopping.

Chopping refers to the swapping of the inputs $in_a$, $in_b$ of error amplifier 214 concurrently with reversal of the polarity of the output $out_{amp}$ of error amplifier 214. Referring for a moment to FIG. 4, a simplified example illustrates chopping. FIG. 4 shows two circuit configurations. On the left, input A is shown connected to the non-inverting input of amplifier G and input B is shown connected to the inverting input. The output C is shown having a given polarity (e.g., plus). When the amplifier G is chopped, the configuration is changed as shown on the right. The inputs are swapped (flipped, reversed, etc.); i.e., input A is now shown connected to the inverting input of amplifier G and input B is shown connected to the non-inverting input. The polarity of output C is reversed in order to maintain the proper polarity due to the inputs having been swapped. When the amplifier G is chopped again, the configuration reverts to the left side configuration, and so on.

Continuing with FIG. 3A, details of error amplifier 214 in accordance with some embodiments are shown. The error amplifier 214 may include an input stage comprising NMOS devices M1a, M2a, connected to inputs $in_a$, $in_b$ respectively. The error amplifier 214 may include a folded cascode stage comprising NMOS devices M2a, M2b, M3a, M3b, M4a, M4b, M5a, and M5b. An output stage of error amplifier 214 may include NMOS devices M6, M7, M8, and M9 to provide the output $out_{amp}$ of error amplifier 214. As will be shown below, the output chopping switches Sc5-Sc10 can reverse the polarity at the output $out_{amp}$.

Figure 5:
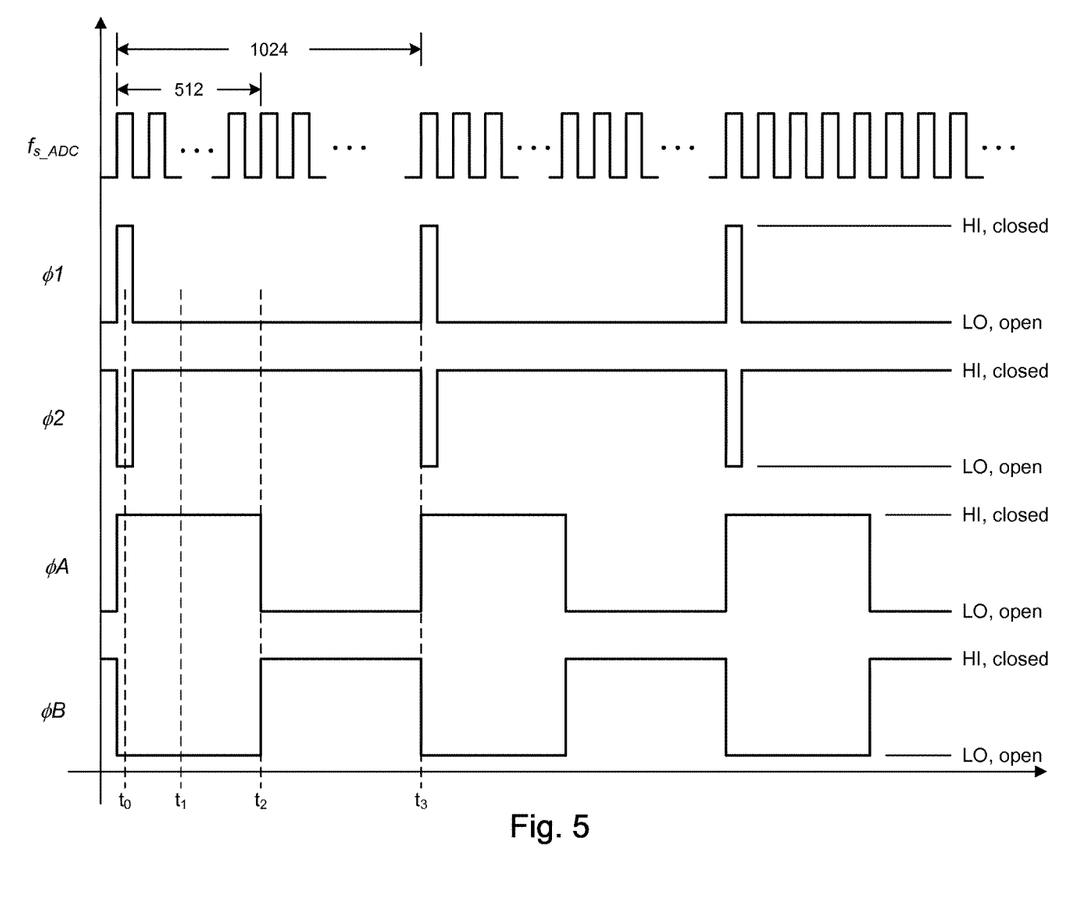
FIG. 5 shows a timing chart for clock signals in accordance with some embodiments.

FIG. 5 illustrates various timing diagrams showing the relative timing between phases φ1, φ2, φA, and φB in accordance with the present disclosure. In accordance with some embodiments, for example, phase φ1 may be inverted relative to φ2. When φ1 is HI, φ2 is LO and vice versa; likewise with φA and φB. When a phase is LO, its corresponding switch may be set to the OPEN state and conversely when a phase is HI, its corresponding switch may be set to the CLOSED state. The OPEN/CLOSED convention shown in FIG. 5 can be used herein without loss of generality. In other words, in other embodiments, switches S1-S8 and Sc1-Sc10 may be in the OPEN state when the corresponding phase is LO, and CLOSED when the corresponding phase is HI.

In accordance with the present disclosure, the error amplifier 214 may operate in sampling mode when φ1 is HI (φ2 LO); e.g., see at time $t_0$ in FIG. 5. Conversely, when φ1 is LO (φ2 HI) offset sampling is not active and the error amplifier 214 may operate in regulation mode; e.g., see times $t_1$ and $t_2$.

Further in accordance with the present disclosure, chopping may occur at the rising and falling edges of φA and φB; e.g., see times $t_2$ and $t_3$.

Figure 6:
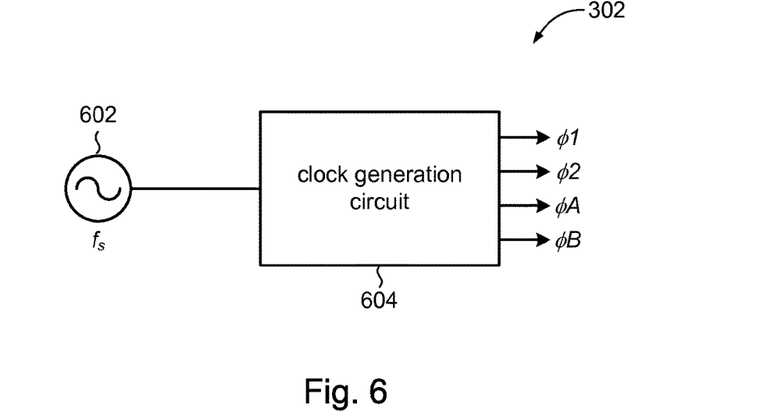
FIG. 6 shows a clock circuit in accordance with some embodiments.

FIG. 6 illustrates an example of clock generator 302 shown in FIG. 3. It will be appreciated that any suitable implementation of clock generator 302 may be used. The clock generator 302 may include an oscillator 602 that operates at a frequency of $f_s$. A clock generation circuit 604 may receive the output of oscillator 602 to produce phases φ1, φ2, φA, and φB. Persons of ordinary skill can implement any suitable circuitry for clock generation circuitry 604 to produce clock signals defined according to the timing diagram shown in FIG. 5.

Figure 7:
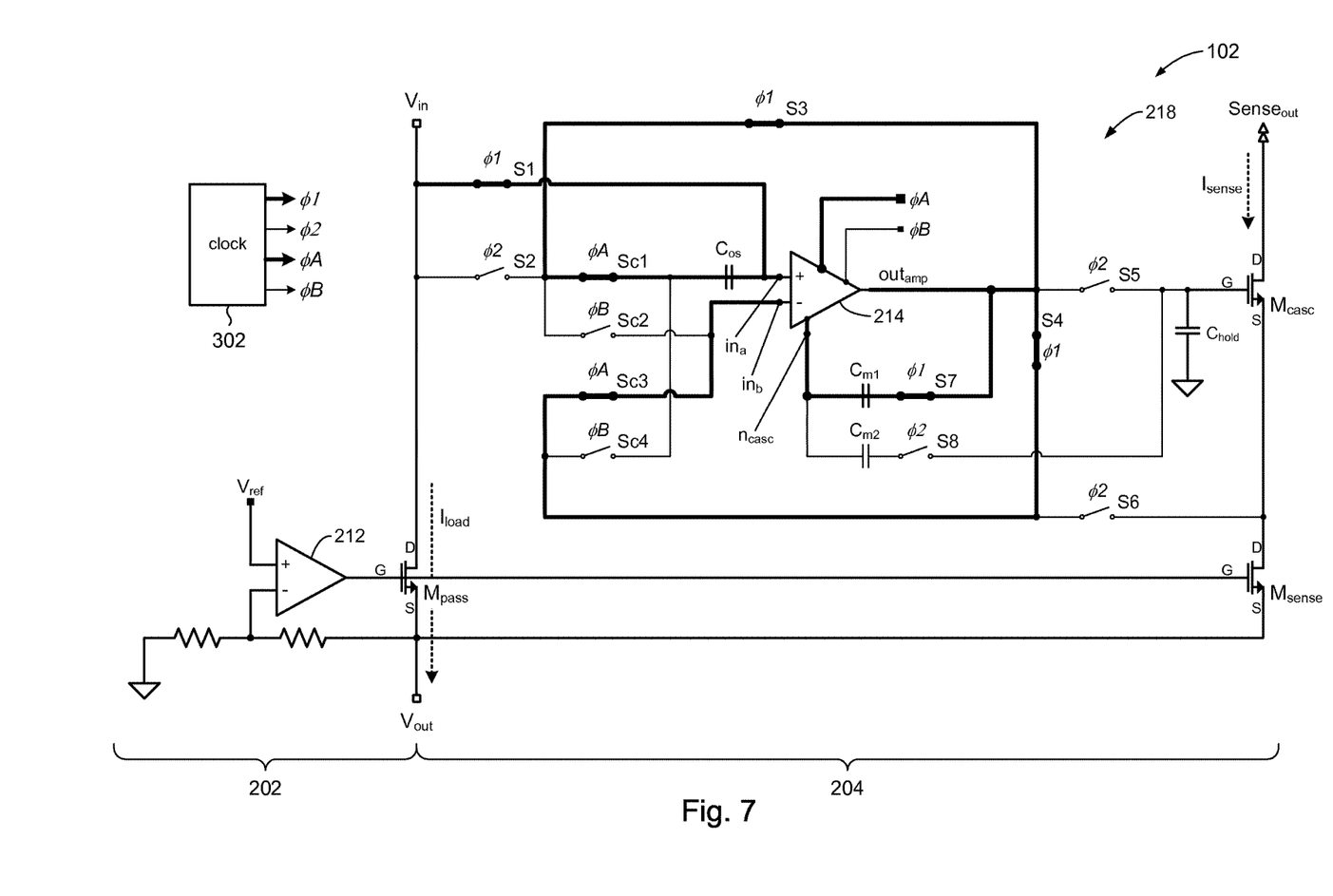
FIG. 7 illustrates a configuration of a voltage regulator in sampling mode in accordance with some embodiments.

FIG. 7 illustrates the configuration of sampling switches S1-S8 and the configuration of input chopping switches Sc1-Sc4 during sampling mode; e.g., when φ1 is HI and φ2 is LO. As can be seen in the timing diagram of FIG. 5, sampling mode coincides with phase φA, so the input chopping switches Sc1 and Sc3 are in the CLOSED state and Sc2 and Sc4 are in the OPEN state during sampling mode.

When the error amplifier 214 is in sampling mode, sampling switches S1, S3, S4, and S8 are in the CLOSED state and S2 and S5-S7 are in the OPEN state. This configuration of the sampling switches S1-S8 electrically disconnects the error amplifier 214 from the gate of current sense output device $M_{casc}$, and thus separates control of $M_{casc}$ from error amplifier 214.

As shown in FIG. 7, the voltage $V_{DS}$ across power output device $M_{pass}$ may be connected directly to the non-inverting input $in_a$ of error amplifier 214 via sampling switch S1, and not through capacitor $C_{os}$. The output $out_{amp}$ of error amplifier 214 may feed back to the inverting input $in_b$ of error amplifier 214 via input chopping switch Sc3. In principle, the feedback drives the voltage difference between the drains of $M_{pass}$ and $M_{sense}$ to zero. The output $out_{amp}$ of error amplifier 214 will be at a proper voltage level to accommodate that (e.g., on the order of Volts). However, in practice the device components (e.g., FIG. 3A) that comprise error amplifier 214 may not be precisely matched; e.g., due to tolerance variations, process variations during fabrication, and so on. Accordingly, a voltage is likely to occur at the output $out_{amp}$ of error amplifier 214 even when the same voltage is applied to the non-inverting and inverting inputs $in_a$, $in_b$. This voltage may be referred to as a DC offset voltage and can manifest itself in the output of error amplifier 214 as a DC level that is added to the output.

In accordance with the present disclosure, this offset voltage may be stored (sampled) onto capacitor $C_{os}$ via sampling switch S3. In some embodiments, capacitor $C_{os}$ may be implemented using metal insulator metal (MIM) or metal oxide metal (MOM) technology in order to achieve a size suitable for holding an offset voltage (which can be plus or minus) of sufficient magnitude. The size of capacitor $C_{os}$ can determine how often offset sampling must be performed.

The gate of current sense output device $M_{casc}$ is not driven by the error amplifier 214 during sampling mode because the error amplifier 214 is disconnected from the gate of $M_{casc}$. Accordingly, the charge stored in capacitor $C_{hold}$ can hold the gate of $M_{casc}$ during sampling mode. The capacitor $C_{hold}$ can therefore prevent the current sense output device $M_{casc}$ from turning OFF during sampling mode. In some embodiments, if φ1 is sufficiently short in duration, the capacitor $C_{hold}$ can be kept small and thus may be suitable for fabrication using the same technology used to fabricate the voltage regulator 102.

Figure 8:
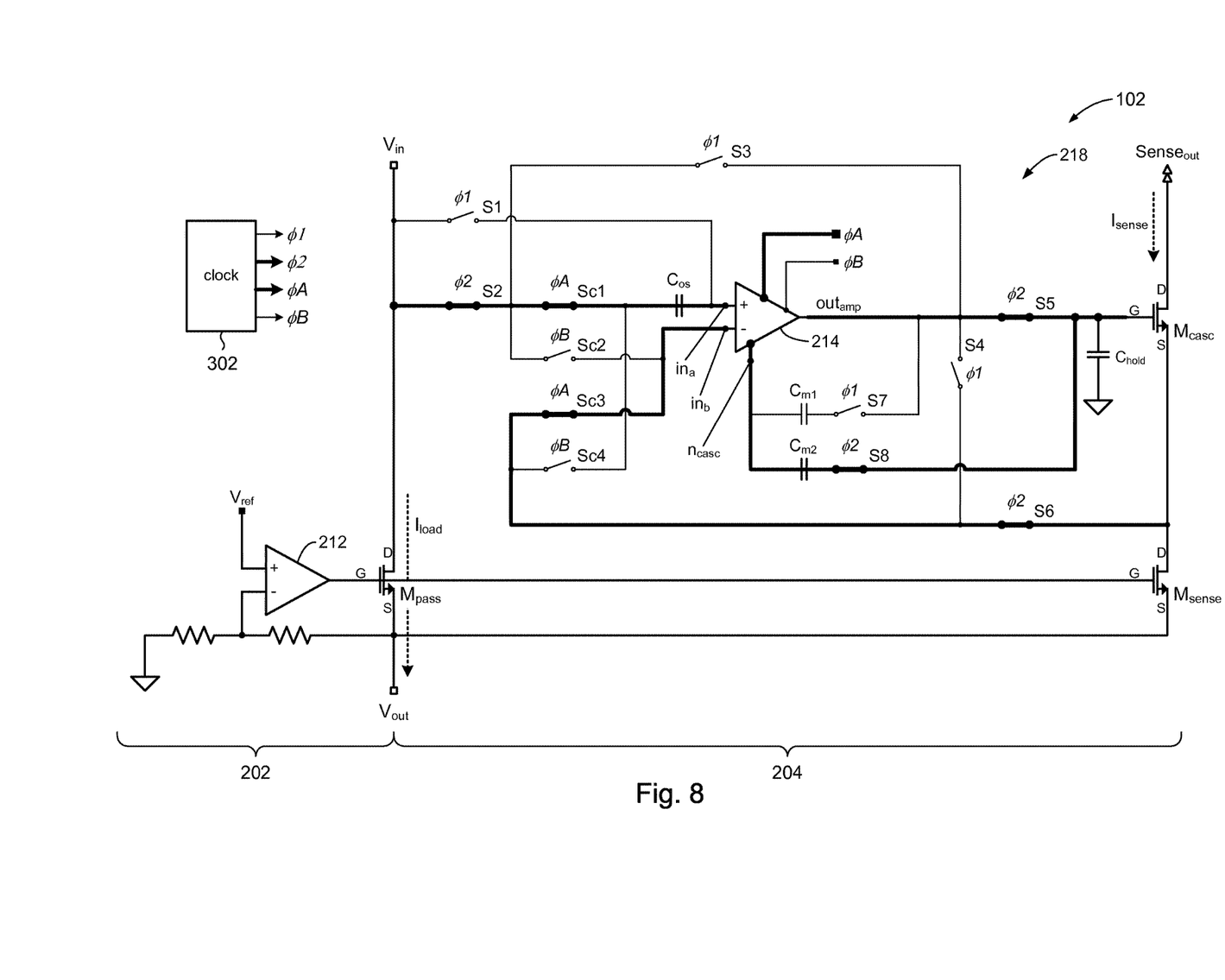
FIGS. 8 and 8A illustrate an example of input chopping in an error amplifier in accordance with some embodiments.

FIG. 8 illustrates the configuration of sampling switches S1-S8 and the configuration of input chopping switches Sc1-Sc4 during regulation mode; e.g. when φ1 is LO and φ2 is HI. The configuration in FIG. 8 shows that φA is HI and φB is LO; the input chopping switches Sc1-Sc4 may be said to be in "φA state." Accordingly, Sc1 and Sc3 are CLOSED and Sc2 and Sc4 are OPEN. FIG. 8 shows an example of regulation in the φA state.

In regulation mode, the error amplifier 214 may operate to control the current sense output device $M_{casc}$ in order to maintain the $V_{DS}$ of sense device $M_{sense}$ equal to the $V_{DS}$ of the power output device $M_{pass}$. In other words, $V_{DS}$ of $M_{sense}$ can track $V_{DS}$ of $M_{pass}$. Accordingly, sampling switch S2 may be CLOSED to connect the $V_{DS}$ of $M_{pass}$ to non-inverting input $in_a$ of error amplifier 214 via input chopping switch Sc1. More particularly, $V_{DS}$ of $M_{pass}$ is connected to the non-inverting input through capacitor $C_{os}$. Recall that capacitor $C_{os}$ stores the offset voltage that was sampled during sampling mode. The voltage on capacitor $C_{os}$ subtractively combines with $V_{DS}$ Of $M_{pass}$, which effectively reduces the DC offset voltage of error amplifier 214.

Sampling switch S6 may be CLOSED to define a feedback path from the $V_{DS}$ of $M_{sense}$ to the inverting input $in_b$ via input chopping switch Sc3. The output $out_{amp}$ of error amplifier 214 may be connected via sampling switch S5 to control the gate of current sense output device $M_{casc}$. The Miller cap $C_{m2}$ may be connected to the output stage of error amplifier 214 (FIG. 3A), via sampling switch S7, to stabilize its operation.

Figure 8A:
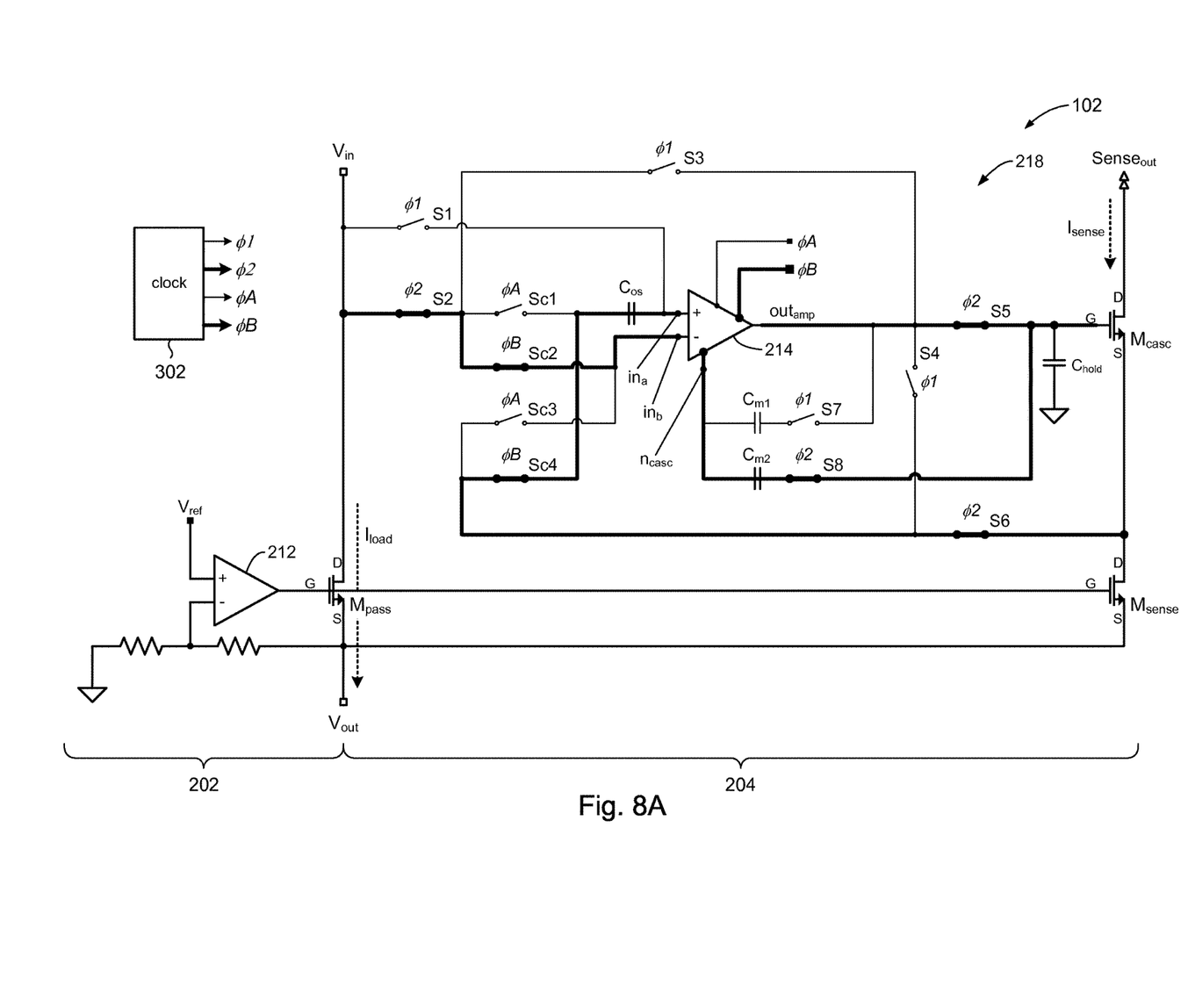

FIG. 8A shows the input chopping switches Sc1-Sc4 in a "φB state," where φA is LO and φB is HI. Accordingly, Sc1 and Sc3 are OPEN and Sc2 and Sc4 are CLOSED. FIG. 8A shows an example of regulation mode in the φB state. A comparison with FIG. 8 shows that the inputs $in_a$, $in_b$ of error amplifier 214 become swapped when chopping occurs. For example, suppose the inputs $in_a$, $in_b$ of error amplifier 214 are in the configuration shown in FIG. 8, namely $V_{DS}$ of $M_{pass}$ is connected to input $in_a$ and $V_{DS}$ of $M_{sense}$ is connected to input $in_b$. At time $t_2$ shown in FIG. 5, the inputs $in_a$, $in_b$ will be "chopped" (flipped, swapped, etc.) and the configuration will be as shown in FIG. 8A, namely $V_{DS}$ Of $M_{pass}$ is connected to input $in_b$ and $V_{DS}$ of $M_{sense}$ is connected to input $in_a$. At time $t_3$, the inputs $in_a$, $in_b$ will be chopped again and the configuration will revert to FIG. 8, and the sequence may repeat at each edge of φA, φB.

Figure 9:
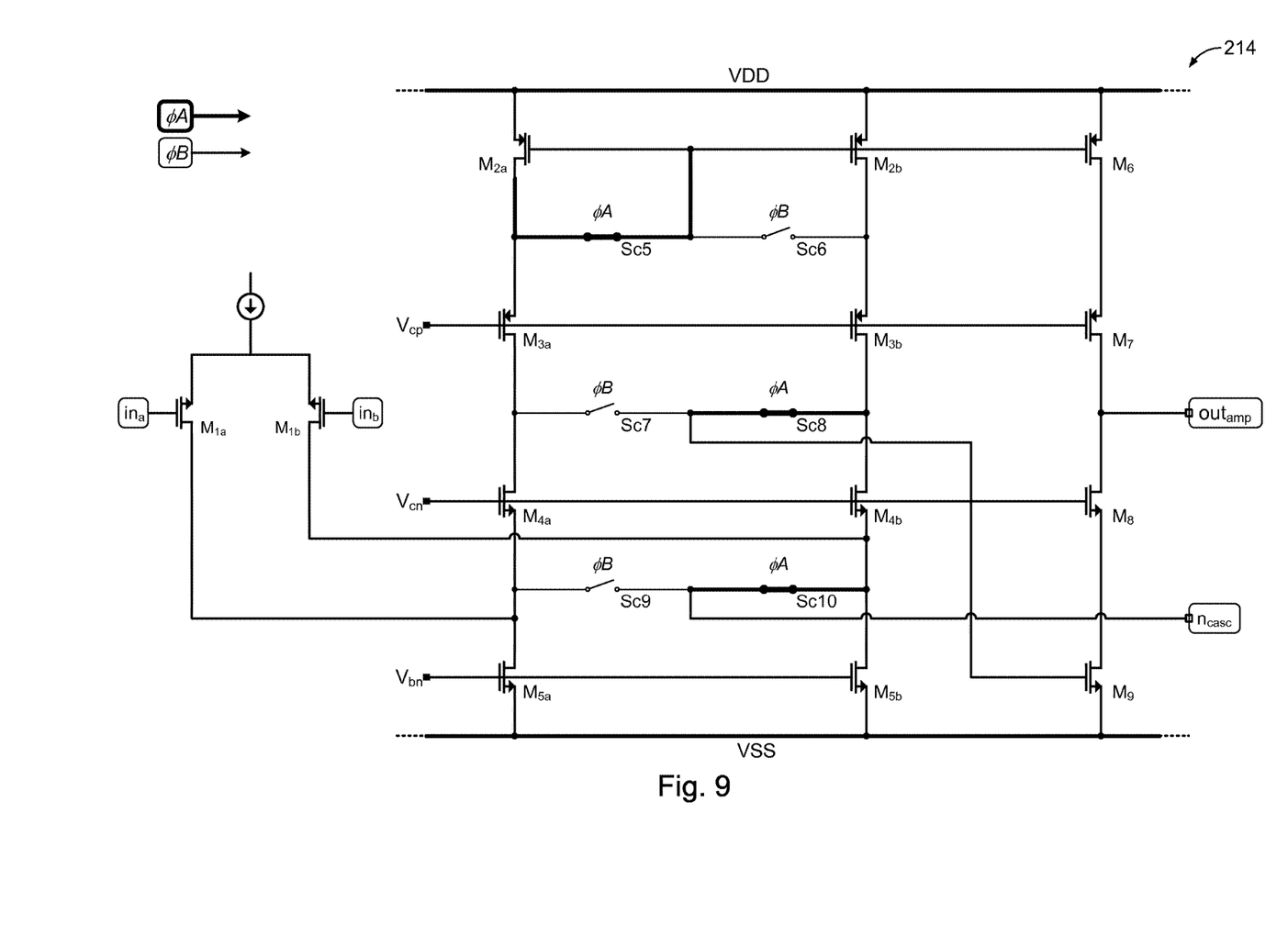
FIGS. 9 and 9A illustrate an example of output chopping in an error amplifier in accordance with some embodiments.

FIG. 9 shows internal details of error amplifier 214 with the output chopping switches Sc5-Sc10 that comprise the folded cascode stage in the φA state. In particular, the Sc5, Sc8 and Sc10 switches are CLOSED and Sc6, Sc7 and Sc9 switches are OPEN. An input differential current will be injected to the drain of the fixed bias current mirror of $M_{5a}$ and $M_{5b}$ and the sources of the folded cascode devices $M_{4a}$ and $M_{4b}$. The current difference of branch of $M_{5a}$ will be mirrored by the top PMOS mirror $M_{2a}$ and $M_{2b}$. The output current will be the summation of $M_{2b}$ and $M_{5b}$, which drives the following common source stage with a fixed bias current from $M_6$. $M_{2a}$ and $M_{2b}$ form a current mirror. The signal current through $M_{2a}$ will be mirrored to $M_{2b}$ and combine with the signal current through $M_{4b}$. This signal then drives the common source stage comprising $M_9$. In order to flip the output polarity, throwing the current switches does three things: it changes the direction of the current mirroring, it now taps the output signal from the other branch and also feeds the Miller compensation signal to the other cascode device.

Figure 9A:
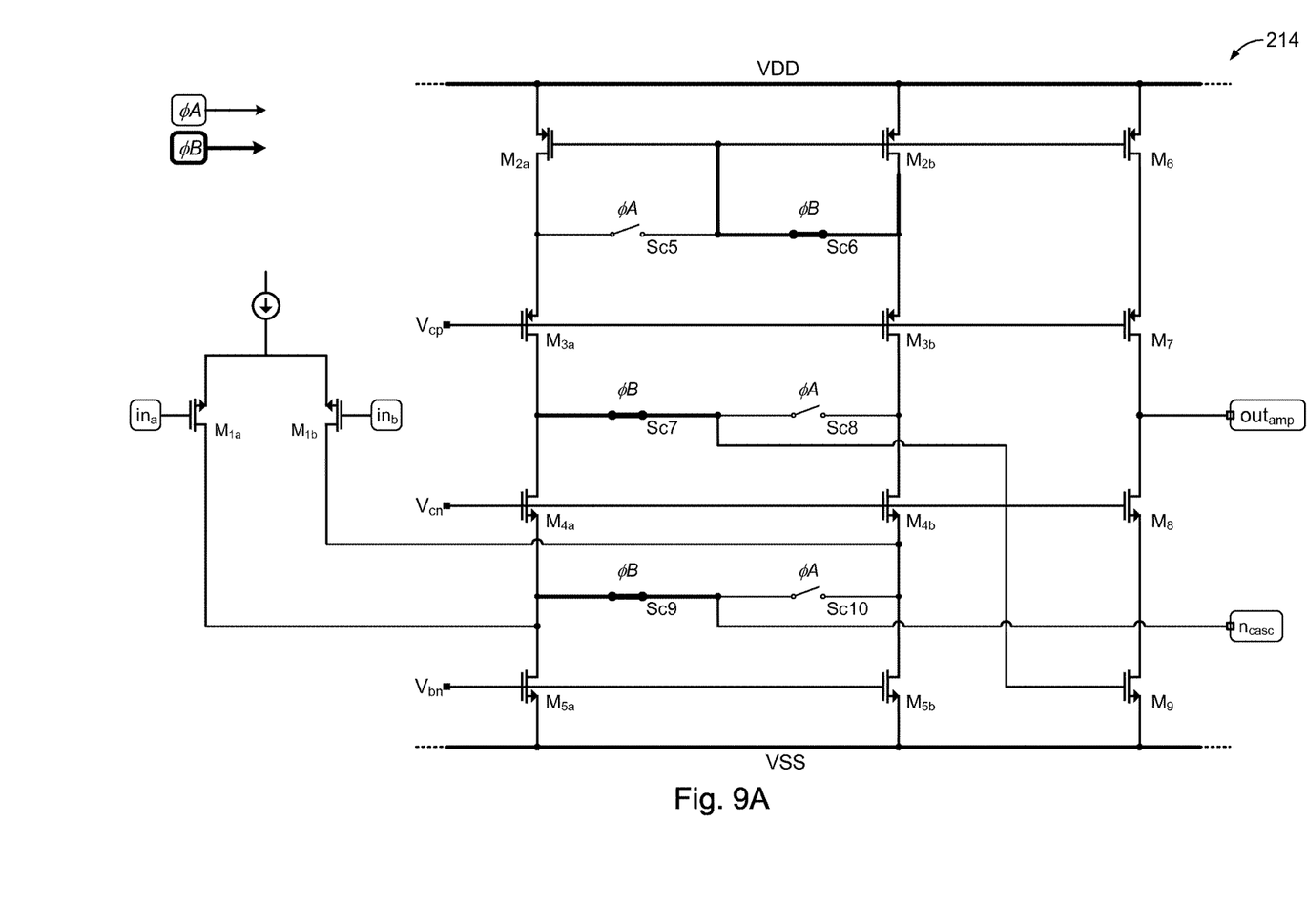

Suppose the output chopping switches Sc5-Sc10 in the folded cascode stage are set as shown in the configuration of FIG. 9. The output $out_{amp}$ is referenced to $V_{SS}$ (e.g., ground potential). At time $t_2$ (FIG. 5), the output $out_{amp}$ of error amplifier 214 will be chopped in response to the clock edges of φA, φB, namely the output chopping switches Sc5-Sc10 will be set as shown in the configuration of FIG. 9A. The polarity of output $out_{amp}$ is inverted. At time $t_3$, the output $out_{amp}$ of error amplifier 214 will again be chopped in response to the clock edges of φA, φB. The output chopping switches Sc5-Sc10 will revert to the configuration of FIG. 9, and the polarity of output $out_{amp}$ will be restored, and the sequence may repeat at each edge of φA, φB.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A circuit comprising:
   a linear drop-out regulator including a pass transistor and a first error amplifier, wherein an output from the first error amplifier is coupled to a gate of the pass transistor;
   a current sense transistor having a source coupled to a source of the pass transistor, wherein the output from the first error amplifier is also coupled to a gate of the current sense transistor;
   a current sense output transistor having a source coupled to a drain of the current sense transistor;
   a second error amplifier having a first input terminal coupled to a drain of the pass transistor and having a second input terminal coupled to the drain of the current sense transistor, wherein an output of the second error amplifier is coupled to a gate of the current sense output transistor, and wherein a drain of the current sense output transistor is an output current node for the circuit;
   offset sampling circuitry configured to compensate for an offset voltage of the second error amplifier with a first kind of offset compensation operation; and
   chopping circuitry configured to compensate for the offset voltage of the second error amplifier with a second kind of offset compensation operation.

2. The circuit of claim 1, wherein inputs of the second error amplifier are swapped and a polarity of the output of the second error amplifier is reversed when the chopping circuitry is configured to perform the second kind of offset compensation operation.

3. The circuit of claim 1, wherein the circuit further comprises a clock circuit to control a timing between the offset compensation operation of the first kind and the second kind of offset compensation operation.

4. The circuit of claim 1, wherein the offset sampling circuitry is configured to produce a sample of the offset error and combine the sample with an input to the second error amplifier, and wherein the chopping circuitry is configured to chop inputs to the second error amplifier and the output of the second error amplifier.

5. The circuit of claim 1, wherein the offset sampling circuitry comprises a plurality of switches, a first capacitor, and a second capacitor, the plurality of switches having a configuration to perform the offset compensation operation of the first kind wherein the plurality of switches:

electrically disconnect the second error amplifier from the first pass transistor;

separate the gate of the current sense output transistor from the second error amplifier;

charge the first capacitor with the offset voltage; and electrically connect the second capacitor to the gate of the current sense output transistor.

6. The circuit of claim 1, wherein the chopping circuitry comprises a first plurality of switches electrically connected to inputs of the second error amplifier and configured to swap the inputs and a second plurality of switches electrically connected to the output of the second error amplifier and configured to reverse a polarity of the output of the second error amplifier.

7. The circuit of claim 1, wherein the circuit further comprises a first compensation capacitor and a second compensation capacitor that are selectively electrically connectable to an output stage of the second error amplifier, the first compensation capacitor being connected to the output stage of the second error amplifier while the first kind of offset compensation operation is performed, the second compensation capacitor being connected to the output stage of the second error amplifier while the first kind of offset compensation operation is not performed.

8. A method comprising:

in a linear drop-out regulator, driving a gate of a pass transistor with an output voltage from a first error amplifier to regulate an output voltage of the linear drop-out regulator;

driving a gate of a current sense transistor with the output voltage from the first error amplifier to conduct a current through the current sense transistor that is combined with a load current from the pass transistor;

producing an output voltage from a second error amplifier responsive to a difference between a drain voltage of the pass transistor and a drain voltage of the current sense transistor;

driving a gate of a current sense output transistor positioned in series with the current sense transistor with the output voltage from the second error amplifier to produce an output current at a drain of the current sense output transistor; and reducing an offset voltage of the second error amplifier by performing a first kind of offset compensation operation and performing a second kind of offset compensation operation.

9. The method of claim 8, wherein performing the first kind of offset compensation operation includes sampling the output voltage of the second error amplifier to produce a sampled output, and using the sampled output as an input to the second error amplifier, wherein performing the second kind of offset compensation operation includes swapping connections at inputs of the second error amplifier and reversing polarity of the output voltage of the second error amplifier.

10. The method of claim 8, further comprising receiving one or more clock signals to control a timing between performing the first kind of offset compensation operation and performing the second kind of offset compensation operation.

11. The method of claim 10, further comprising using the one or more clock signals to control a plurality of switches to perform the first kind of offset compensation operation and to perform the second kind of offset compensation operation.

* * * * *